| United States Patent [19] | [11] Patent Number: 4,895,685 |
| Honda et al. | [45] Date of Patent: Jan. 23, 1990 |

[54] CROSSLINKED COMPOSITE MEMBRANE AND PROCESS FOR PRODUCING THE SAME

[75] Inventors: Zenjiro Honda; Hajime Komada; Hiroki Karakane, all of Himeji, Japan

[73] Assignee: General Director of the Agency of Industrial Science and Technology, Tokyo, Japan

[21] Appl. No.: 308,785

[22] Filed: Feb. 10, 1989

Related U.S. Application Data

[62] Division of Ser. No. 6,151, Jan. 23, 1987, Pat. No. 4,824,573.

[30] Foreign Application Priority Data

Jan. 23, 1986 [JP]  Japan .................................. 61-11088
Jan. 23, 1986 [JP]  Japan .................................. 61-11089

[51] Int. Cl.$^4$ .............................................. B01D 13/04
[52] U.S. Cl. .......................... 264/45.5; 264/DIG. 48; 264/DIG. 62
[58] Field of Search ...................... 264/41, 45.1, 45.3, 264/45.5, 45.8, 48, DIG. 48, DIG. 62; 424/428

[56] References Cited

U.S. PATENT DOCUMENTS

3,993,071  11/1976  Higuchi et al. ..................... 424/428

*Primary Examiner*—Frank Sever
*Attorney, Agent, or Firm*—Birch, Stewart, Kolasch & Birch

[57] ABSTRACT

A crosslinked composite membrane having high permeation velocity and separation factor and a process for producing the same. The membrane comprises a skin layer comprising a crosslinking reaction product of a water-soluble polysaccharide having a sulfonate group and/or a sulfonic acid group and a polyfunctional melamine compound the crosslinked composite membrane can be formed on a porous base such as an ultrafilter.

12 Claims, No Drawings

CROSSLINKED COMPOSITE MEMBRANE AND PROCESS FOR PRODUCING THE SAME

This is a division of application Ser. No. 07/006151, 01/23/87, now U.S. Pat. No. 4,824,573.

BACKGROUND OF THE INVENTION:

1. Field of the Invention:

The present invention relates to a process for separating water from an aqueous solution of an organic substance or a vapor of a mixture of an organic substance and water. More particularly, the present invention relates to a membrane used for separating and concentrating an aqueous solution of an organic substance by pervaporation or a vapor of a mixture of an organic substance and water by vapor permeation and a process for producing said membrane.

2. Prior Art:

In the field which relates to the concentration of an aqueous solution of an organic substance having a low concentration or separation thereof by means of a membrane, a reverse osmosis method has been employed in practice. However, since the reverse osmosis method requires the application of a pressure which is higher than the osmotic pressure of the solution to be treated, this method cannot be employed in the treatment of an aqueous solution having a high concentration and a high osmotic pressure. Thus, the concentration of the solution which can be treated is limited.

The pervaporation method and vapor permeation method have attracted attention as new methods of separating water without being influenced by the osmotic pressure. In the pervaporation method, the solution to be treated is fed onto the primary side of the membrane and the pressure on the secondary side (permeation side) of the membrane is reduced or, alternatively, a gaseous carrier is blown therein to permeate the substance to be separated in a gaseous phase through the membrane. The vapor permeation method is different from the pervaporation method in that the vapor mixture is fed onto the primary side of the membrane. The substance permeated through the membrane is collected by cooling and thereby condensing the permeated vapor. There are various reports on the pervaporation method. For example, for the treatment of an aqueous ethanol solution, a homogeneous cellulose acetate membrane is disclosed in the specification of U.S. Pat. No. 2,953,502 and a polyvinyl alcohol membrane is reported in U.S. Pat. No. 3,035,060. The separation factors in both of these processes are low. Though a composite membrane comprising a skin layer which comprises a cellulose acetate film or a polyvinyl alcohol film is disclosed in the specification of Japanese Patent Laid-Open No. 109204/1984 and a crosslinked composite polyethyleneimine membrane is disclosed in the specification of Japanese Patent Laid-Open No. 55305/1984, only a low permeation velocity or separation factor is obtained by their use. A membrane made of an anionic polysaccharide is disclosed in the specification of Japanese Patent Laid-Open No. 129104/1985. Since the raw materials for the membranes shown in the examples in said specification are water-soluble polymers, the durability of the membrane is poor in the treatment of an aqueous solution of an organic substance having a low concentration. It is described therein that the crosslinking is effected sufficiently for insolubilizing the membrane in water, although this process is not shown in the examples. However, usually, the permeation velocity is reduced, even though the separation factor is increased by the crosslinking treatment, as will be shown in the comparative examples given below.

As described above, a large surface area is required of the separation membrane used in the conventional pervaporation and vapor permeation methods because of a low permeation velocity. Further, it is necessary to circulate the permeated liquid of a high concentration so as to concentrate the liquid to an intended concentration because of a low separation factor. Therefore, the costs of the apparatuses and operations are disadvantageously high in the conventional processes.

SUMMARY OF THE INVENTION

An object of the present invention is to provide a separation membrane which exhibits a sufficient durability and high permeation velocity and separation factor over a wide concentration range of an organic substance in the separation of an aqueous solution of the organic substance or a vapor of a mixture of the organic substance and water by a pervaporation or a vapor permeation method.

DETAILED DESCRIPTION OF THE PREFERRED EMBODIMENTS:

The term "permeation velocity" as used herein indicates the amount (kg/m$^2$.h) of the mixture permeated per unit area of the membrane per unit time. The separation factor ($\alpha$) is the ratio of (the ratio of water to the organic substance in the permeated vapor) to (the ratio of water to the organic substance in the feed liquid or vapor) as follows:

$$\alpha = (X/Y)_p / (X/Y)_f$$

wherein X and Y represent water and the organic substance, respectively, in the two-component system and p and f represent the permeation and feeding, respectively.

The thickness of the membrane is preferably as thin as possible for increasing the permeation velocity. However, the thinner the membrane, the lower the mechanical strength thereof. To realize a high permeation velocity while maintaining the mechanical strength of the membrane, a composite membrane comprising a dense, thin film (skin layer) having a separating function provided on a porous base is used. The thinner the skin layer, the higher the permeation velocity. However, as the thickness of the skin layer is reduced, defects are caused on the film surface and the separation factor is reduced in the conventional processes.

According to the process of the present invention, a crosslinked composite membrane having a high permeation velocity and a high separation factor but free of the above-described defects is produced.

After an intensive investigation, the inventors have found that the above-mentioned problems can be solved by employing the following process to form the following membrane:

(1) A crosslinked composite membrane comprising a skin layer which comprises a crosslinked reaction product of a water-soluble polysaccharide having a sulfonate group and/or a sulfonic acid group and a polyfunctional melamine compound.

(2) A crosslinked composite membrane according to the above item 1, wherein the skin layer comprises a crosslinked reaction product having a water content of 50 to 300% and has a thickness of 3 μm or less.

3) A crosslinked composite membrane according to the above item 1 or 2, wherein the water-soluble polysaccharide is sulfoethylcellulose or its alkali salt.

4) A crosslinked composite membrane according to the above item 1 or 2, wherein the polyfunctional melamine compound is n-methoxymethylmelamine, n being at least one of di- to hexa-.

5) A process for producing a crosslinked composite membrane, comprising the steps of applying a solution containing a water-soluble polysaccharide having a sulfonate group and/or a sulfonic acid group and a polyfunctional melamine compound to a porous base; effecting the drying of the solution and the crosslinking of the solutes simultaneously to form a skin layer having a crosslinked structure formed by covalent bonds on the porous base; and repeating the application of the solution and the crosslinking treatment.

6) A process for producing a crosslinked composite membrane according to the above process of item 5, wherein the application and crosslinking treatment are effected at least twice.

7) A process for producing a crosslinked composite membrane according to the above process of items 5 or 6, wherein the crosslinking mixture solution is applied by immersion or by means of a bar coater, roller or doctor blade.

8) A process for producing a crosslinked composite membrane according to the above process of items 5 or 6, wherein the crosslinking treatment comprises heating or irradiation with U.V. rays or electron beams.

To permeate water selectively from an aqueous solution of an organic substance or a vapor of an organic substance/water mixture, it is preferred to introduce a functional group having a high capacity of coordinating with water in the membrane. Water coordinated with the membrane is called bound water as opposed to free water of a bulk liquid. Matsuura et al. reported in "Separation Science and Technology" 17, 821 (1982) that when a cellulose polymer is used, the solubility of the organic substance in bound water is far lower than that observed when another polymer is used. However, when the cellulose membrane is used, a high separation factor cannot be obtained in the separation of water from the organic substance. The present inventors attempted to introduce an anionic group having a high capacity of coordinating with water in a polysaccharide so as to increase the permeation of water and the capacity of separating the organic substance. However, the polysaccharide having the anionic group introduced therein became water-soluble depending on the degree of substitution. When such a membrane is used in the treatment of an aqueous solution of an organic substance having a low concentration, it is dissolved therein or swollen and the function of the membrane is seriously deteriorated, though this membrane is durable in the solution of a high concentration. The resistance of the polysaccharide having the anionic group to the aqueous solution of an organic substance having a concentration over a wide range can be increased by crosslinking the polysaccharide by covalent bonds to form a three-dimentional structure. However, when the membrane is crosslinked, the permeation velocity thereof is usually reduced, while its separation factor is increased.

After an intensive investigation of polysaccharides having an anionic group and crosslinking agents, the present inventors have found that a membrane comprising a polysaccharide having a sulfonate group and/or a sulfonic acid group and a melamine crosslinking agent has a separation factor and a permeation velocity increased by the crosslinking which differ from the ordinary crosslinked membranes.

The composite membrane having a thin skin layer is used for increasing the permeation velocity. Such a membrane is usually prepared by the application of a polymer solution having a low concentration or by reducing the thickness of the coating film. However, the skin layer thus formed is easily influenced by the surface conditions (shapes of the pores, surface structure, adhesion of foreign materials, etc.) of the base film and, as a result, the skin layer of the finished composite membrane has defects. Therefore, the application/drying process of the film-forming solution is repeated so as to eliminate or to mend the flaws. However, when the thin layer is not crosslinked, a part of the already formed thin layer is dissolved in the film-forming solution applied thereto and, therefore, the intended effects of mending the micro-flaws cannot be obtained by the repeated applications.

The present invention will now be described in more detail.

A preferred example of the polysaccharides having a sulfonate group and/or a sulfonic acid group is sulfoethylcellulose. The pH of an aqueous solution of a mixture comprising the polysaccharide having a sulfonate group and/or a sulfonic acid group and a melamine compound is adjusted to 6 or below or preferably 4 or below and then the solution is spread on a porous base such as an ultrafilter. Any mineral or organic acids can be used for controlling the pH of said aqueous solution. The counter ions of the polysaccharides having a sulfonate group include ions of alkali metals, alkaline earth metals, transition metals and ammonium ions of the formula: $R_4N^+$ wherein R represents a hydrogen atom or an alkyl group. Among the above mentioned ions, alkali metal ions and particularly sodium ion are preferred.

The amount of the crosslinking agent is 3 to 60 wt. %, preferably 10 to 40 wt. %, based on the polysaccharide having a sulfonate group and/or a sulfonic acid group. When the amount of the crosslinking agent is insufficient, the obtained membrane will have a low water resistance, while when said amount is excessive, the formed membrane is hard and brittle. Thus, it is difficult to obtain the membrane having properties which pass the performance evaluation tests.

The skin layer comprising the crosslinked thin film is preferably as thin as possible as long as no pinholes are formed. The thickness of this skin layer is 0.03 to 3 μm, preferably 0.05 to 0.5 μm.

The process of the present invention for producing the crosslinked composite film comprises applying a solution containing as a solute a compound crosslinkable by covalent bonds to a porous base, drying the same and simultaneously effecting the crosslinking of the solutes to form a crosslinked thin film on the porous base and, if necessary, repeating the application and crosslinking treatment. Thus, even when the crosslinked thin film formed by the application and crosslinking has flaws, these flaws can be eliminated or mended by repeated application of the crosslinking mixture solution followed by the crosslinking treatment. Since the chemical structure of the material for the crosslinked thin film is the same as that of the compound in the crosslinking mixture solution except for the crosslinking portion, the crosslinked thin film has a high affinity with said solution and uniform coating can be obtained by the repeated application. Further, since the formed thin film is crosslinked, this film once formed cannot be re-dissolved in the applied solution in the repeated application and the flaws of the film can be eliminated efficiently.

The bases are those having fine pores having a diameter of several ten to several thousand angstroms in the surface layer. These include bases made of known materials such as polysulfones, polyether sulfones, polyacrylonitriles, cellulose esters, polycarbonates and polyvinylidene fluorides.

Preferred examples of the polyfunctional melamine compounds used as the crosslinking agent are n-methylolmelamines (n being di- to hexa-) and particularly n-methoxymethylmelamines (n being di- to hexa-) formed by methylating said n-methylolmelamines. The membranes of the present invention can be in the form of a film, a tube or a hollow fiber. The films may be laminated directly or molded in a pleated or spiral molding to be used as a module.

The membrane thus prepared is used to separate water from an aqueous solution containing one or more organic compounds or from a vaporous mixture of water and one or more organic compounds selected from the group consisting of alcohols such as methanol, ethanol, 1-propanol, 2-propanol and n-butanol; ketones such as acetone and methyl ethyl ketone; ethers such as tetrahydrofuran and dioxane; organic acids such as formic and acetic acids; aldehydes such as acetaldehyde and propionaldehyde; and amines such as pyridine and picoline.

The composite membrane having a skin layer comprising a crosslinked thin film prepared from a polysaccharide having a sulfonate group and/or a sulfonic acid group and a melamine crosslinking agent is characterized with water resistance and heat resistance properties which are superior to those of a membrane comprising a non-crosslinked polysaccharide having a sulfonate group and/or a sulfonic acid group. In addition, the composite membrane exhibits permeation velocity and separation factor which are higher than those of a membrane prepared by using another crosslinking agent such as a polyvalent epoxy or aldehyde compound in he treatment of a mixture of water and organic compound(s).

According to the process of the present invention for producing the crosslinked composite membrane by the repeated application/crosslinking treatments, an ultra-thin composite membrane having a high separation factor and a high permeation velocity can be produced, while flaws are apt to be formed in the membrane produced by the conventional process wherein the application is effected only once.

REFERENTIAL EXAMPLE 1

Synthesis of sulfoethylcellulose:

42.6 g of linters are dispersed in 480 g of isopropanol. 45 g of a 40% aqueous sodium hydroxide solution is added to the dispersion and the mixture is heated to 70° C. 14.9 g of 2-bromoethanesulphonic acid is added thereto and the obtained mixture is heated under reflux for 30 min. Additional 14.9 g of 2-bromoethanesulfonic acid is added thereto and the mixture was heated under reflux for 60 min. 8.4 g of a 90% aqueous acetic acid solution is added to the reaction mixture to neutralize the same. The neutralized mixture is washed with 2 l of a 75% aqueous methanol solution and filtered. This procedure is repeated again. The product is dried at 60° C. in vacuum for 24 hr. The degree of substitution with a sulfonic acid group of the glucose ring is 0.3.

EXAMPLE 1

(1) Preparation of crosslinked composite membrane:

The pH of a mixture comprising 90 parts by weight of a 2% aqueous solution of sulfoethylcellulose prepared in Referential Example 1 and 10 parts by weight of a 2% aqueous solution of hexamethoxymethylmelamine is adjusted to 4 with 10 wt. % hydrochloric acid. The mixture solution is applied to a polyethersulfone ultrafilter (DUS 40; a product of Daicel Ltd.) with a doctor blade having a slit thickness of 250 μm. Then, it is heat-treated at 100° C. for 1 hr.

(2) Evaluation of the performance of the membrane:

Vapor of a mixture of ethanol and water (weight ratio: 95/5) having a temperature of 83° C. and gauge pressure of 0.3 kg/cm$^2$ is fed onto the primary side (skin layer) of the membrane prepared in the above process (1) and the pressure on the secondary side of the membrane is reduced to 3 mmHg. When the compartment of the secondary side of the membrane is closed, the pressure of this compartment is elevated up to to 6 mmHg by the vapor of the ethanol/water mixture permeated through the membrane. The total molar number of the mixture vapor permeated through the membrane is calculated from the volume of the closed compartment and the time taken for the elevation of the pressure. The temperature of the closed compartment is kept at 80° C. The compositions of the fed mixture vapor and the mixture vapor in the closed compartment are analyzed according to gas chromatography to calculate the permeation velocity and the separation factor. The calculated permeation velocity and separation factor coincided with those determined by trapping the permeated mixture vapor with liquid nitrogen and calculating them from the weight and the composition of the components of the vapor determined by the analysis.

(3) Results of the evaluation of the performance of the membrane:

The results are shown in Table 1.

EXAMPLES 2 to 4

The same procedure as in Example 1 is repeated except that the ratio of sulfoethylcellulose to hexamethoxymethylmelamine in step (1) of Example 1 is altered. The results are summarized in Table 1.

COMPARATIVE EXAMPLES 1 to 6

The same procedure as in Example 1 is repeated except that sulfoethylcellulose used in step (1) is replaced with a water-soluble polymer shown in Table 2 and that the water-soluble polymer and hexamethoxymethylmelamine are used in amounts (parts by weight) as shown in Table 2. As the relative amount of hexamethoxymethylmelamine is increased, both the permeation velocity and separation factor are reduced when the water-soluble polymer is carboxymethylcellulose, and the separation factor is increased while the permeation velocity is reduced when said polymer is polyvinyl alcohol.

EXAMPLE

The same procedure as in Example 1 is repeated except that hexmethoxymethylmelamine is replaced with trimethoxymethylmelamine. The permeation velocity and separation factor are 0.20 kg/m².h and 1250, respectively.

COMPARATIVE EXAMPLES 7 and 8

The same procedure as in Example 1 was repeated except that hexamethoxymethylmelamine used in step (1) is replaced with a crosslinking agent shown in Table 3. The results are shown in Table 3. It is apparent that the permeation velocity is not changed significantly and the separation factor was reduced.

TABLE 1

|  | 2% aqueous solution of sulfoethyl-cellulose (parts by weight) | 2% aqueous solution of hexamethoxy-methylmelamine (parts by weight) | Permeation velocity (kg/m².h) | Separation factor (α) | Water content of the membrane (%) |
| --- | --- | --- | --- | --- | --- |
| Ex. 1 | 90 | 10 | 0.14 | 1140 | 285 |
| 2 | 80 | 20 | 0.16 | 1280 | 205 |
| 3 | 80 | 20 | 0.16 | 1280 | 205 |
| 4 | 60 | 40 | 0.13 | 1500 | 120 |
| 4 | 60 | 40 | 0.13 | 1580 |  |

TABLE 2

|  | 2% aqueous solution of water-soluble polymer | | 2% aqueous solution of hexamethoxy-methylmelamine (parts by wt.) | Permeation velocity (kg/m² · h) | Separation factor (α) | Water content of the membrane (%) |
| --- | --- | --- | --- | --- | --- | --- |
|  | Polymer | (parts by wt.) |  |  |  |  |
| Comp. Ex. 1 | sodium carboxymethyl-cellulose (degree of substitution: 0.75%) | 90 | 10 | 0.097 | 892 | 245 |
| 2 | sodium carboxymethyl cellulose (degree of substitution: 0.75%) | 80 | 20 | 0.062 | 367 |  |
| 3 | sodium carboxymethyl-cellulose (degree of substitution: 0.75%) | 60 | 40 | 0.044 | 362 |  |
| 4 | polyvinyl alcohol (degree of saponification: 99.5%) | 88 | 12 | 0.029 | 515 |  |
| 5 | polyvinyl alcohol (degree of saponification: 99.5%) | 75 | 25 | 0.015 | 687 |  |
| 6 | polyvinyl alcohol (degree of saponification: 99.5%) | 62 | 38 | 0.008 | 1150 |  |

TABLE 3

|  | 2% aqueous solution of sulfoethyl-cellulose (parts by wt.) | 2% aqueous solution of crosslinking agent | | Permeation velocity (kg/m² · h) | Separation factor (α) | Water content of the membrane (%) |
| --- | --- | --- | --- | --- | --- | --- |
|  |  | Crosslinking agent | (parts by wt.) |  |  |  |
| Comp. Ex. 7 | 90 | glyoxal-modified urea | 10 | 0.19 | 210 | 883 |
| 8 | 90 | glyoxal | 10 | 0.21 | 350 | — |

EXAMPLES 6 and 7

The sulfoethylation reaction of cellulose is repeated in the same manner as in Referential Example 1 to form sulfoethylcellulose having a degree of substitution of 0.91. The obtained 2% aqueous sulfoethylcellulose solution is mixed with a 2% aqueous hexamethoxymethylmelamine solution in a ratio shown in Table 4. The pH of the mixture is adjusted to 3.5 with hydrochloric acid and the mixture is applied to a polyether sulfone ultrafilter (DUS-40; product of Daicel Ltd.) with a wire bar having a winding of 0.2 mm. Immediately thereafter, the filter is placed in a dustfree thermostatted over kept at 100° C. and dried for 8 min. The application/drying steps were repeated further three times to effect the coating four times in total. After the heat treatment effected at 100° C. for 30 min, the performance of the obtained membrane is evaluated by the vapor permeation method in the same manner as in Example 1 to obtain the results shown in Table 4.

TABLE 4

|  | 2% aqueous solution of sulfoethylcellulose (Parts by wt.) | 2% aqueous solution of hexamethoxymethylmelamine (Parts by wt.) | Conc. of ethanol fed (%) | Conc. of ethanol permeated (%) | Permeation velocity (kg/m$^2$·h) | Separation factor ($\alpha$) |
|---|---|---|---|---|---|---|
| Ex. 6 | 80 | 20 | 92.1 | 0.5 | 0.917 | 2561 |
| 7 | 95 | 5 | 93.8 | 0.5 | 0.888 | 4257 |
| Comp. Ex. 9 | 100 | 0 | 95.5 | 3.2 | 0.271 | 643 |

COMPARATIVE EXAMPLE 9

A non-crosslinked composite membrane is prepared in the same manner as in Example 6 except that no hexamethoxymethylmelamine is used. The performance of this membrane is examined in the same manner as in Example 1 to obtain the results shown in Table 4. The permeation velocity and separation factor of this membrane are lower than those of the melamine-crosslinked membrane. Thus, the effects of the melamine crosslinking is obvious.

What is claimed is:

1. A process comprising producing a crosslinked composite membrane by the steps of:
    applying a crosslinking solution containing reactants which comprise a water-soluble polysaccharide having a sulfonate group and/or a sulfonic acid group and a polyfunctional melamine compound to a porous base;
    effecting the drying of the crosslinking solution and the crosslinking of the reactants simultaneously to form a skin layer having a crosslinked structure formed by covalent bonds on the porous base; and
    repeating said process steps.

2. The process according to claim 1, wherein said process steps are repeated at least twice.

3. The process according to claims 1 or 2, wherein the crosslinking solution is applied by immersion or by means of a bar coater, roll or doctor blade.

4. The process according to claims 1 or 2, wherein the crossing is effected by heating or irradiation with U.V. rays or electron beams.

5. The process according to claim 1, wherein said crosslinking solution has a pH of 6 or below.

6. The process according to claim 1, wherein said crosslinking solution has a pH of 4 or below.

7. The process according to claim 1, wherein the porous base is an ultrafilter.

8. The process according to claim 1, wherein the water-soluble polysaccharide is sulfoethylcellulose or an alkali salt thereof.

9. The process according to claim 1, wherein the polyfunctional melamine compound is n-methoxymethylmelamine, n being di to hexa.

10. The process according to claim 1, wherein the polyfunctional melamine compound is an n-methylolmelamine, n being di to hexa.

11. The process according to claim 1, wherein the polyfunctional melamine compound content is 3 to 60 wt. %.

12. The process according to claim 1, wherein the polyfunctional melamine compound content is 10 to 40%.

* * * * *